United States Patent
Janakiraman et al.

(10) Patent No.: US 10,311,305 B2
(45) Date of Patent: Jun. 4, 2019

(54) SYSTEMS AND METHODS FOR CREATING A STORY BOARD WITH FORENSIC VIDEO ANALYSIS ON A VIDEO REPOSITORY

(71) Applicant: Honeywell International Inc., Morristown, NJ (US)

(72) Inventors: Kirupakar Janakiraman, Madurai (IN); Naga Sundar KandhaMunisamy, Madurai (IN); Rajesh Kulandaivel Sankarapandian, Madurai (IN); Ramesh Arumaikani, Tirunelveli (IN); Keyurbhai Patel, Bangalore (IN); Baskaran Muthusamy, Karaikudi (IN)

(73) Assignee: Honeywell International Inc., Morris Plains, NJ (US)

( * ) Notice: Subject to any disclaimer, the term of this patent is extended or adjusted under 35 U.S.C. 154(b) by 102 days.

(21) Appl. No.: 15/463,208

(22) Filed: Mar. 20, 2017

(65) Prior Publication Data

US 2018/0268223 A1   Sep. 20, 2018

(51) Int. Cl.
*G06K 9/00* (2006.01)
*G11B 27/10* (2006.01)

(52) U.S. Cl.
CPC ..... *G06K 9/00751* (2013.01); *G06K 9/00677* (2013.01); *G06K 9/00771* (2013.01); *G11B 27/10* (2013.01); *G06K 2209/21* (2013.01); *G06K 2209/27* (2013.01)

(58) Field of Classification Search
None
See application file for complete search history.

(56) References Cited

U.S. PATENT DOCUMENTS

| | | | |
|---|---|---|---|
| 7,996,771 B2 | 8/2011 | Girgensohn et al. | |
| 8,457,354 B1 | 6/2013 | Kolar et al. | |
| 9,087,386 B2 | 7/2015 | Morris et al. | |
| 9,247,211 B2 | 1/2016 | Zhang et al. | |
| 9,286,777 B2 | 3/2016 | Vallone et al. | |
| 9,576,003 B2 * | 2/2017 | McGrew | G06Q 50/18 |
| 2001/0049826 A1 | 12/2001 | Wilf | |

(Continued)

FOREIGN PATENT DOCUMENTS

| | | | | |
|---|---|---|---|---|
| CN | 103733196 A | 4/2014 | | |
| WO | WO 2012/092150 A2 | 7/2012 | | |
| WO | WO 2012092150 A2 * | 7/2012 | | H04N 5/76 |

OTHER PUBLICATIONS

Scientific Working Group on Digital Evidence—Best Practices for Computer Forensics, Version 2.1, Jul. 2006.

(Continued)

*Primary Examiner* — Delomia L Gilliard
(74) *Attorney, Agent, or Firm* — Seager, Tufte & Wickhem LLP (57) ABSTRACT

Systems and methods for creating a story board with forensic video analysis on a video repository are provided. Some methods can include storing a plurality of video data streams in a data repository, storing asynchronous streams of metadata of each of the plurality of video data streams in the data repository, identifying a first object captured by at least one of the plurality of video data streams, using the asynchronous streams of metadata to identify correlations or interactions between the first object and a plurality of other objects over time, and replicating a story of the first object.

20 Claims, 5 Drawing Sheets

(56) References Cited

U.S. PATENT DOCUMENTS

| | | | |
|---|---|---|---|
| 2007/0098303 A1 | 5/2007 | Gallagher et al. | |
| 2007/0132767 A1 | 6/2007 | Wright et al. | |
| 2010/0235535 A1* | 9/2010 | Zhu | H04L 65/4061 709/231 |
| 2010/0287161 A1* | 11/2010 | Naqvi | G06K 9/00771 707/740 |
| 2010/0296742 A1 | 11/2010 | Chandrasekaran et al. | |
| 2012/0062732 A1* | 3/2012 | Marman | H04N 7/18 348/142 |
| 2013/0039634 A1 | 2/2013 | M | |
| 2013/0091432 A1* | 4/2013 | Shet | G08B 13/19645 715/719 |
| 2013/0226758 A1* | 8/2013 | Reitan | G06Q 40/00 705/35 |
| 2013/0229433 A1* | 9/2013 | Reitan | G06F 3/011 345/633 |
| 2013/0321647 A1* | 12/2013 | Khawand | H04N 5/222 348/207.1 |
| 2013/0332545 A1* | 12/2013 | Primus | H04L 51/32 709/206 |
| 2014/0067875 A1* | 3/2014 | Martinez | G06F 17/30702 707/803 |
| 2014/0071287 A1 | 3/2014 | Tu et al. | |
| 2015/0113018 A1* | 4/2015 | Steed | G06F 17/30539 707/776 |
| 2015/0181164 A1* | 6/2015 | Yang | H04M 3/567 348/14.08 |
| 2015/0248710 A1 | 9/2015 | Medvedovsky et al. | |
| 2015/0312190 A1* | 10/2015 | Rankin | H04W 4/21 709/206 |
| 2016/0155063 A1* | 6/2016 | Rich | G06N 99/005 706/12 |
| 2016/0203386 A1 | 7/2016 | Porecki et al. | |
| 2016/0350901 A1* | 12/2016 | Shuster | G06K 9/62 |
| 2018/0012630 A1* | 1/2018 | Thomee | G11B 27/036 |

OTHER PUBLICATIONS

Scientific Working Group Imaging Technology, Section 7—Best Practices for Forensic Video Analysis, Version 1.0, Jan. 16, 2009.

Extended European search report for corresponding EP application 18155934.5, dated Aug. 27, 2018.

English-language translation of CN patent publication 103733196 A, dated Apr. 16, 2014.

* cited by examiner

FIG. 1

Incident Detail Report

Summary:

Incident ID:     5
Incident Type:   Abandoned object
Priority:        Urgent
Location:        /Facility/Terminal7
Age:             0d 1h 35m 6s

Incident Life Cycle:

David started responding incident on 12/16/2015 12:58:38 AM
David closed incident on 12/16/2015 1:07:17 AM Comments:

.\administrator 12/15/2015 11:35:31 PM
Abandoned object has been identified at terminal 7 by the patrolling guard

| Step Details | Time Stamp |
|---|---|
| 1 Initialize forensic manager to identify the object location<br>Comment: Initialized the forensic manager to identify the object | David 12/16/2015<br>12:58:43 AM |
| 2 Pass video and metadata information to forensic analysis module<br>Comment: The video meta data identified for a period of time is sent to Forensic analysis module | David 12/16/2015<br>1:00:23 AM |
| 3 Feed each video recording to Object classification module and object relationship builder<br>Comment: The object relationship builder has generated the result | David 12/16/2015<br>1:01:33 AM |
| 4 Produce the identified objects from the object classification module<br>Comment: Object classification and identification module has generated the list of identified object | David 12/16/2015<br>1:02:15 AM |

5 Store analysis results for further analysis into object

*FIG. 2A*

Incident Detail Report identification and classification module
Comment: Store the object classification result for future analysis
David 12/16/2015 1:02:42 AM

6 Identify Associated persons and track their activity using the forensic video analytic engine
Comment: Identified the associated persons at CAM-77
David 12/16/2015 1:03:55 AM

7 Identify associated objects and tag them
Comment: Associated objects are identified and tagged their types using object classification module
David 12/16/2015 1:04:33 AM

8 The incident and attach the story
Comment: Attached are the abandoned object incident story which the Forensic manager has generated
David 12/16/2015 1:07:11 AM

SYSTEMS AND METHODS FOR CREATING A STORY BOARD WITH FORENSIC VIDEO ANALYSIS ON A VIDEO REPOSITORY

FIELD

The present invention relates generally to forensic video analysis. More particularly, the present invention relates to systems and methods for creating a story board with forensic video analysis on a video repository.

BACKGROUND

Forensic video analysis (FVA) is an investigative, post-event forensic science, and the International Association for Identification (IAI) has formally recognized FVA as a sub-specialty within the scientific discipline of forensic imaging. Specifically, EVA is the scientific examination, comparison, and evaluation of video in legal matters. That is, FVA is the application of image science and domain expertise to interpret the content of an image or the image itself in legal matters. Disciplines of FVA with law enforcement applications include photogrammetry, photographic comparison, content analysis, and image authentication. For example, a forensic analyst may want to identify information regarding the interaction of people and objects in an easy and accurate manner and may want a detailed incident management report with artifacts supporting the same for producing in a court of law. Similarly, a legal person may want to view sufficient and untampered artifacts to articulate an incident in detail, including the people and objects involved in the incident.

The Scientific Working Group on Imaging Technology (SWGIT) sets standards for FVA and identifies the following tasks for the process of FVA: technical preparation, examination, and interpretation. During the interpretation process, specific subject matter expertise is applied to draw conclusions about video recordings or the content of those recordings. For example, drawing a conclusion about a video recording can include authenticating the video recording. Drawing a conclusion about the content of a video recording can include comparing objects or determining that an object appears different in the video than the object appears under normal lighting conditions due to the properties of the recording process, such as an infrared (IR) negative image effect on natural fibers.

Any incident management report that the interpretation process generates must comply with the SWGIT standards, meet the requirements of an analyst's agency, address a requestor's needs, and provide all relevant information in a clear and concise manner. However, there are currently no known systems or methods to perform FVA on a video repository of raw video data, as per the SWGIT standards, for example, to back track a person or object to create a story board of various incidents involving that person or object or an associated person or object. Furthermore, there are currently no known systems or methods to perform an investigation on multiple associated persons, including tracking objects associated with such persons and interactions between such persons and objects, or to create a story board of such persons and objects. This is because known systems and methods to interpret video and to generate incident management reports are manual and align with video data, not metadata.

Notwithstanding the above, known video systems generate thousands of video data streams per day, and one or more of those video data streams may contain representations of people or objects relevant to suspicious activities. However, most such video data streams exist only as data until they are overridden or flushed, not translated into metadata that can be a valuable data node for future FVA.

In view of the above, there is a continuing, ongoing need for improved systems and methods.

DETAILED DESCRIPTION

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein can include systems and methods for creating a story board with FVA on a video repository. It is to be understood that systems and methods disclosed herein can execute FVA offline. That is, in some embodiments, the FVA as disclosed and described herein can be executed on a stream of metadata, for example, when an original video data stream is unavailable.

In accordance with disclosed embodiments, video data streams or video clips that are generated by video surveillance cameras and/or stored on video management servers or storage servers in video management systems can be encapsulated with a proprietary data structure, including a proprietary file header. Accordingly, systems and methods disclosed herein can decapsulate the proprietary file header from a video data stream and execute a rapid analysis over the video data of the video data stream to convert the video data into a stream of asynchronous metadata. Then, the metadata can be stored in an atomic state in a forensic metadata repository, and information can be autonomously extracted from the metadata and converted into an incident management report.

As explained above, the process of interpretation in FVA includes applying specific subject matter expertise to draw conclusions about video data streams or video clips or the content of those video data streams or video clips. Such conclusions can include identifying various correlations and interactions, for example, between persons and/or objects depicted in the video data streams or the video clips over time. In some embodiments, systems and methods disclosed herein can autonomously identify such correlations from stored metadata to replicate the story of an incident or the workflow of an event, to identify interactions at locations of interest or information about areas of interest, to identify the time and the state of conditions during incidents, or to track persons or objects in metadata.

Figure 1:
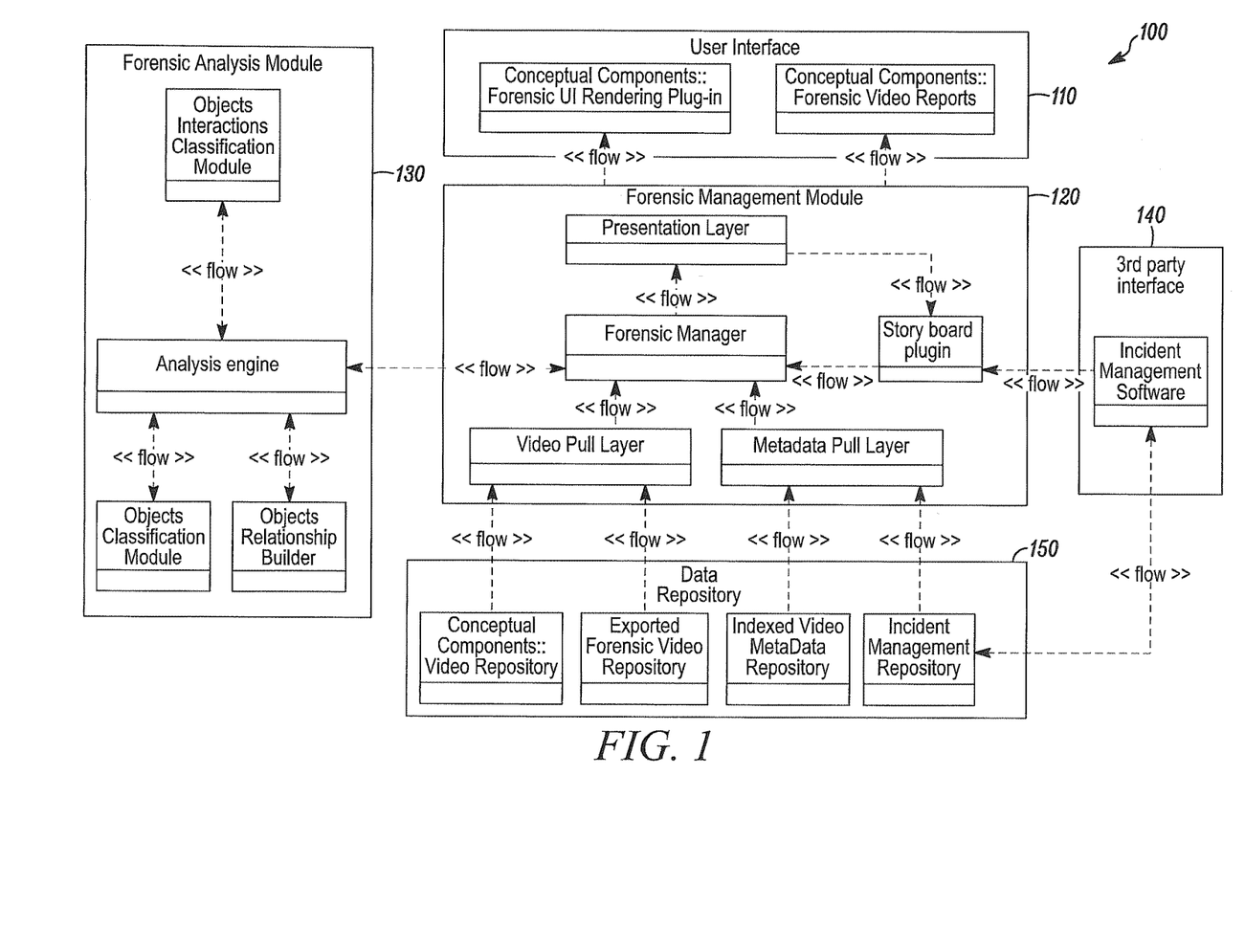
FIG. 1 is a block diagram of a system in accordance with disclosed embodiments.

FIG. 1 is a block diagram of a system 100 in accordance with disclosed embodiments. As seen in FIG. 1, the system 100 can include a user interface 110, a forensic management module 120, a forensic analysis module 130, a third party interface 140, and a data repository 150.

The user interface 110 can include an incident management tool interface and an intelligent video management system (IVMS) client interface. In some embodiments, the incident management tool interface can act as a plug in to existing architecture and can receive and transmit additional parameters to the existing architecture that can be used to fabricate incident management reports. For example, the incident management tool interface can act as a centralized interface for calibrating the additional parameters, and the supplied additional parameters can cause the existing architecture to embed metadata associated with an incident in an incident management report, including embedding metadata in video data in an incident management report. In some embodiments, the IVMS client interface can receive and transmit instructions to configure the forensic analysis module 130, to manage incidents, and to trigger storyboard reporting.

The forensic management module 120 can include components and adapters for pulling video data and audio data from the data repository 150, for decoding and decompressing raw data, for managing a metadata schema, for normalizing metadata in a metadata database, for providing a storyboard interface, for managing objects in the user interface 110, and for managing plug ins for the forensic analysis module 130.

The forensic analysis module 130 can act as an analytical plug in engine to existing architecture and can classify persons and objects, detect, identify, and track persons and objects, and process images to assist the forensic management module 120 in extracting metadata from raw video data. In some embodiments, the forensic analysis module 130 can identify relationships between objects and persons and/or can identify a relationship schema. In either embodiment, identified relationships or an identified relationship schema can be input to a relationship builder.

The third party interface 140 can integrate the incident management tool interface of the user interface 110 and other components of the system 100 with the forensic management module 120. For example, the third party interface can include a plurality of adapters for integrating third parties with events that require notification.

Finally, the data repository 150 can store the data and the metadata of raw video data, indexed metadata of various incidents, persons, and objects, incident management data and workflow metadata, and system states and associated framework metrics. In some embodiments, the data repository 150 can be only accessible via the forensic management module 120 to maintain security, and in some embodiments, encapsulated data can only be decapsulated by users with authenticated credentials. In some embodiments, the video data in the data repository 150 can be normalized to a common form for a plurality of users, vendors, or integrators, but can be specific to a user, vendor, or integrator so that the video data can only be decoded with an adaptor specific to the particular user, vendor, or integrator. Furthermore, in some embodiments, databases in the data repository 150 can use a dynamic schema that can evolve at runtime. For example, in some embodiments, runtimes can be scheduled at periodic intervals, and data can be translated as per the dynamic schema or rule that is adapted per the runtime requirements of a particular scheduled runtime.

In accordance with the above and below described embodiments, systems and methods disclosed herein can passively analyze multiple video data streams or video clips asynchronously to identify, locate, and track objects and to refine metadata associated with the objects for further forensic analysis. For example, the user interface 110 can receive user input identifying a primary or initial person or object.

In accordance with the above and below described embodiments, systems and methods disclosed herein can decapsulate and decode video data and translate raw video data into image streams, metadata, and configuration parameters that can be analyzed to identify navigation patterns of a person or object and to identify related persons or objects. For example, existing video data in the data repository 150 can be converted into streams of optimized metadata, and the forensic analysis module 130 can execute asynchronous threads of analysis over such data to search for and identify the primary or initial person or object, can build an initial schema with mappings and associations to the primary or initial person or object, can build metadata of the primary or initial person or object based on the analysis over the data in the data repository 150, can mark possible interactions of the primary or initial person or object with secondary persons or objects as well as associated metadata, can create a dynamic schema based on such interactions, can refine associations between the primary or initial person or object and the secondary persons or objects, can evolve metadata in the data repository 150 with marking information for the primary or initial person or object, the secondary persons or objections, and the interactions therebetween, and can define persons or objects of interest and locations or zones of interest based on the dynamic schema. In some embodiments, evolving the metadata in the data repository 150 can include building correlation rules that can be used by the user interface 110 to generate incident management reports as disclosed and described herein so that such reports can include all relevant information that has been associated with a person or object of interest.

Figure 2A:
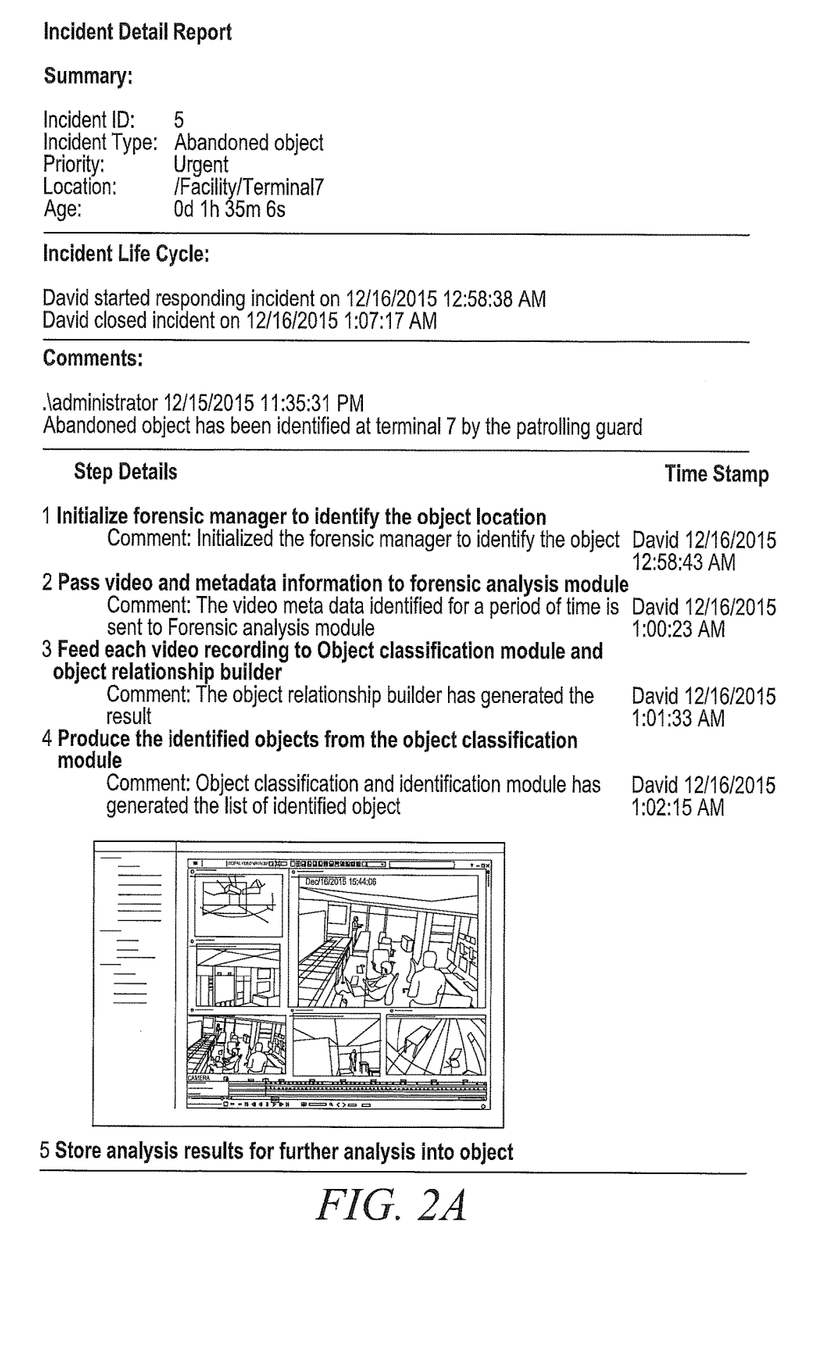
FIG. 2A is a first portion of an exemplary incident management report that can be generated in accordance with disclosed embodiments.
Figure 2B:
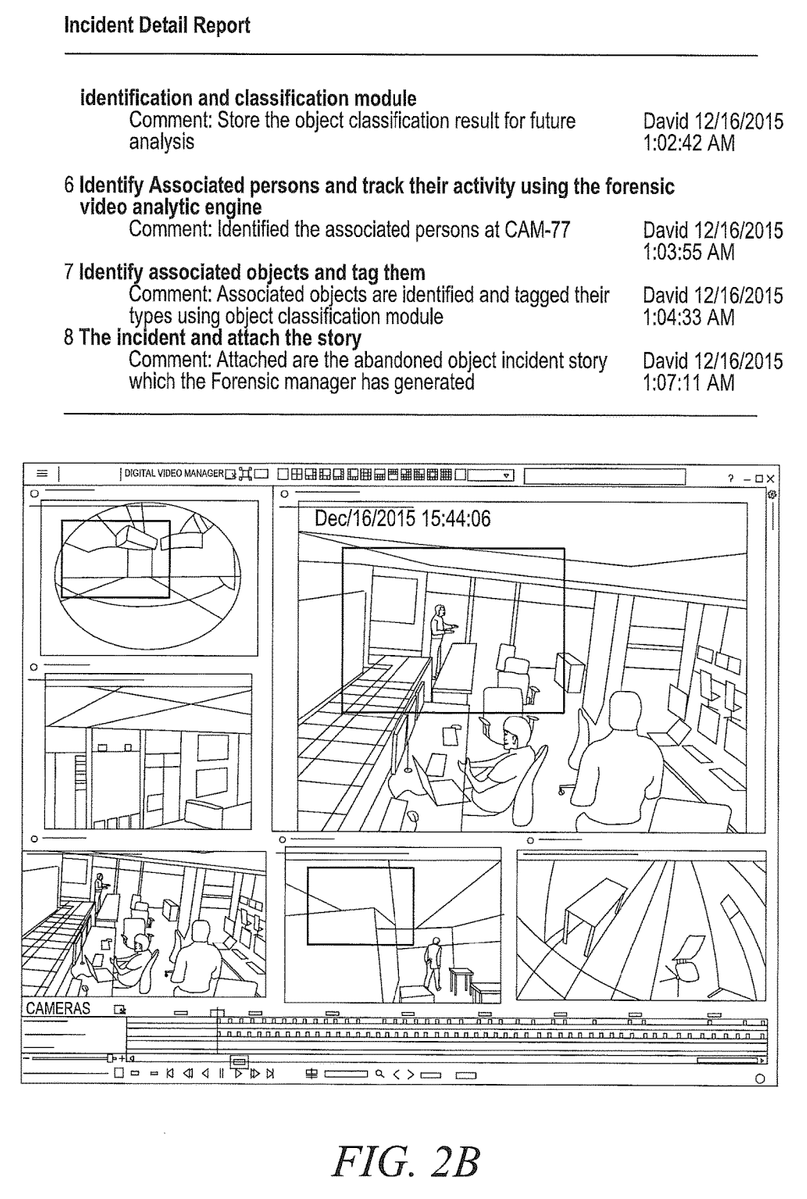
FIG. 2B is a second portion of an exemplary incident management report that can generated in accordance with disclosed embodiments.

In some embodiments, the defined persons and objects of interest and locations or zones of interest can be stored in the data repository 150 and be marked and plotted on a monitor of the user interface 110 or be included in incident management reports that can be generated on top of the metadata. For example, FIG. 2A and FIG. 2B are exemplary incident management reports that can be generated in accordance with disclosed embodiments. As seen, the reports can be generated based on the forensic analysis as disclosed and described herein and can include metadata and video footage, an identification of persons or objects of interest and locations or zones of interest, information related to areas, zones, or facilities, and snapshots of events of interest.

Figure 3:
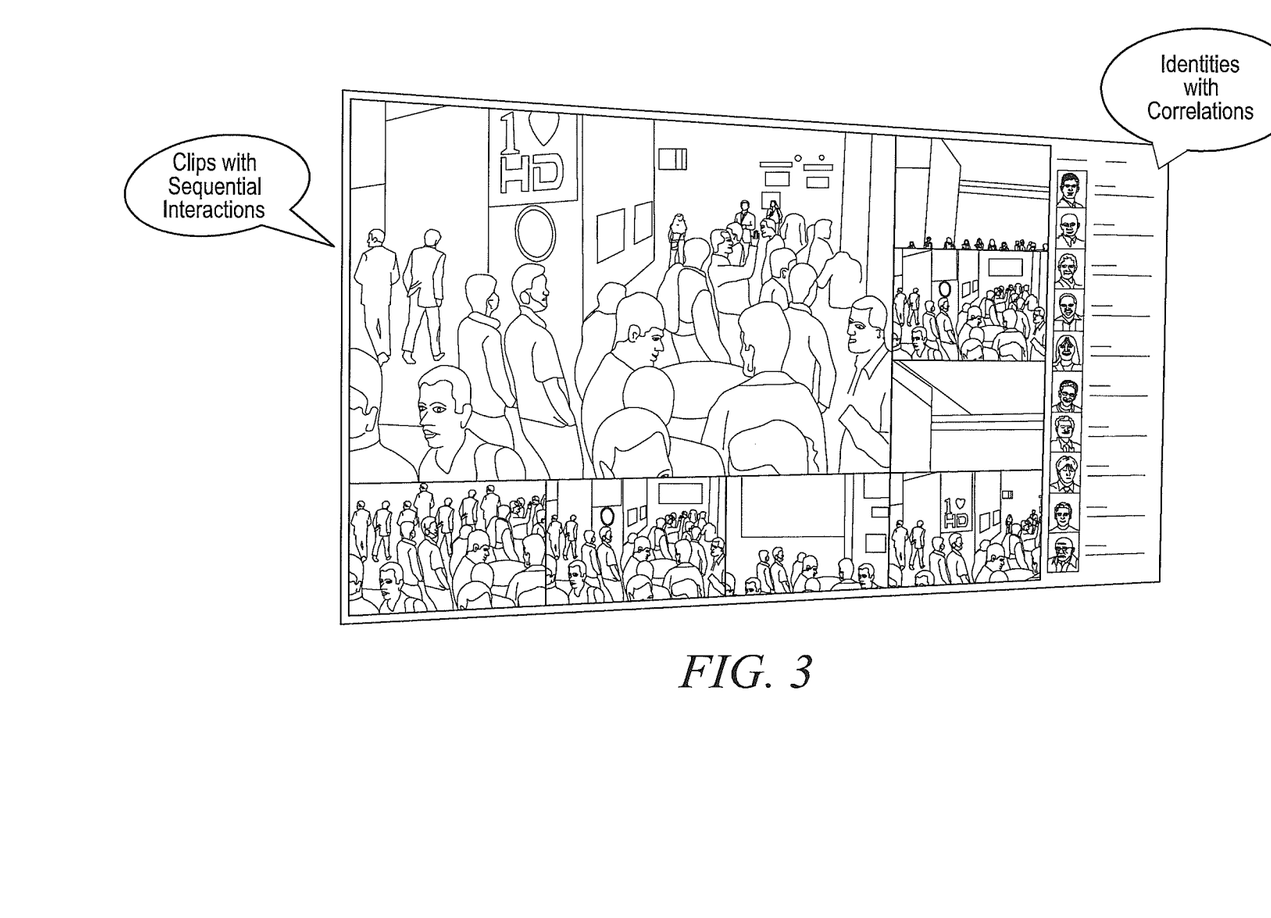
FIG. 3 is an exemplary storyboard that can be generated in accordance with disclosed embodiments.

Furthermore, in some embodiments, a generated incident management report and the metadata used to generate the same can be translated into a storyboard that can include a set of footages and correlated events that can be displayed on a monitor of the user interface 150 as seen in FIG. 3. For example, the storyboard shown in FIG. 3 can display persons or objects of interest in a demultiplexed manner by rearranging the order of video data streams from surveillance cameras to present an intelligent, for example, logical or chronological, view of the order of events of interest. In some embodiments, systems and methods disclosed herein can stream metadata to the user interface 150 for displaying the same on the storyboard.

In some embodiments, systems and methods disclosed herein can generate a walk through report for a floor plan that can include the history of persons or objects of interest navigating the respective region as well as occupancy details for the same, for example, the number of employees, security guards, or visitors in an identified region. In some embodiments, systems and methods disclosed herein can collect occupancy details and the like from other subsystems as would be known by those of skill in the art.

Figure 4:
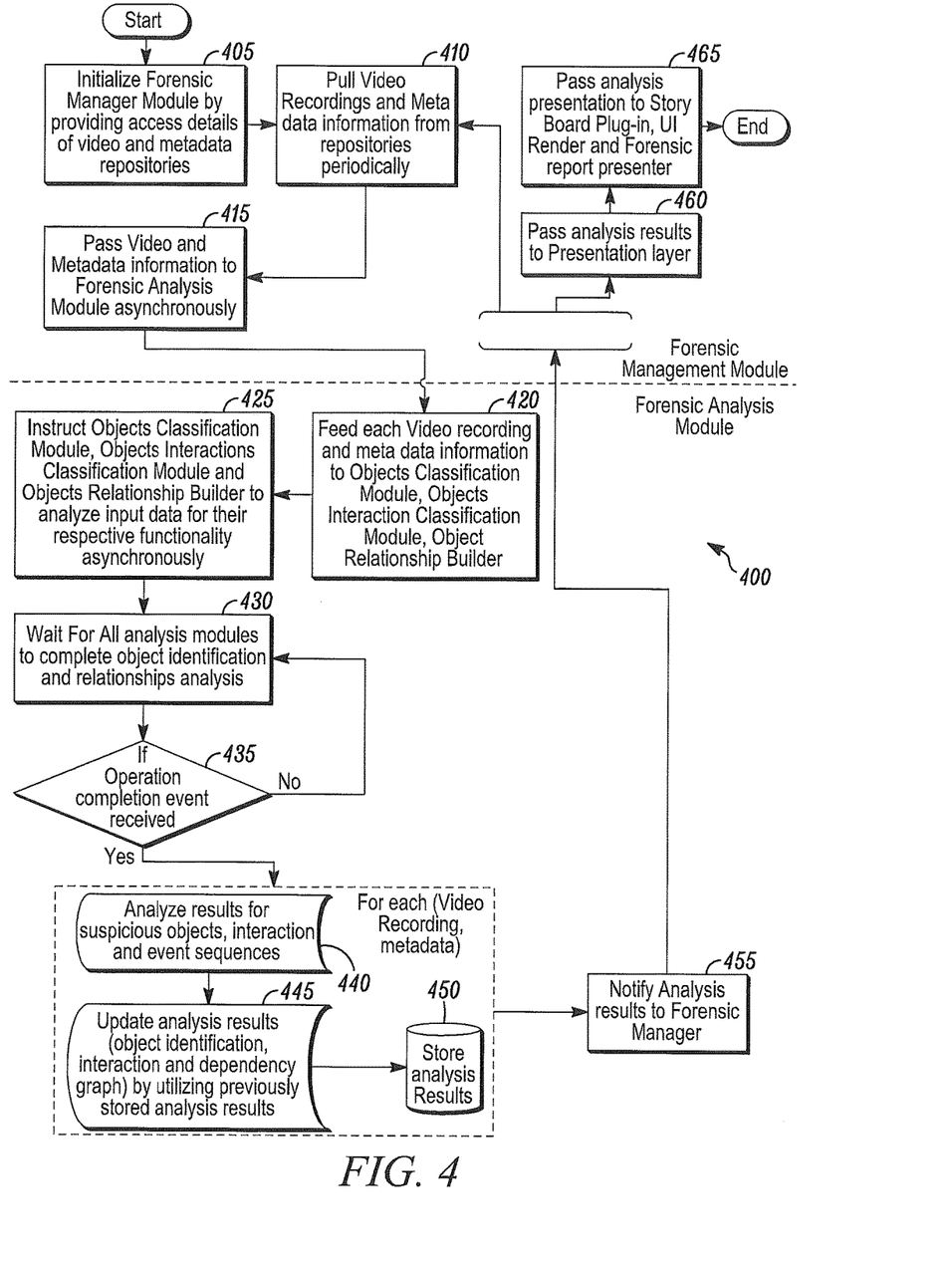
FIG. 4 is a flow diagram of a method in accordance with disclosed embodiments.

FIG. 4 is a flow diagram of a method 400 in accordance with disclosed embodiments. As seen in FIG. 4, the method 400 can include providing access details or credentials for video and metadata repositories in the data repository 150 as in 405 to, for example, initialize the forensic management module 120. Then, the method 400 can include periodically pulling video recordings and metadata information from the video and metadata repositories as in 410 and asynchronously passing the video and metadata information to the forensic analysis module 130 as in 415.

After the forensic module 130 receives the video and metadata information, the method 400 can include feeding each video recording and metadata information to an objects classification module, an objects interaction classification module, and an objects relationship builder as in 420 and instructing the objects classification module, the objects interactions classification module, and the objects relationship builder to asynchronously analyze input data as in 425 to classify objects, to classify object interactions, and to build object relationships. The method 400 can include waiting for the objects classification module, the objects interactions classification module, and the objects relationship builder to complete their object identification and relationship analysis as in 430 and determining whether an operation completion event has been received as in 435.

When the method determines that an operation completion event has been received as in 435, the method 400 can include, for each video recording and metadata information, analyzing the results from the objects classification module, the objects interactions classification module, and the objects relationship builder for suspicious objects, interactions, and event sequences as in 440 and updating the analysis results, including any object identification, interaction, and dependency graphs, as in 445 by utilizing previously stored analysis results in a stored analysis results database 450.

The method 400 can include notifying the forensics management module 120 of the analysis results as in 455, and, after the forensics management module 120 receives the analysis results, the method 400 can include continuing to periodically pull video recordings and metadata information from the video and metadata repositories as in 410, passing the analysis results to a presentation layer as in 460, and passing a presentation of the analysis results to a storyboard plug in, a user interface renderer, or a forensic report presenter as in 465 for generation and presentation of the same.

It is to be understood that the systems and methods as disclosed and described above, can be implemented with a transceiver device for communicating with a plurality of surveillance cameras or servers and a memory device for storing video data streams and metadata, each of which can be in communication with control circuitry, one or more programmable processors, and executable control software as would be understood by one of ordinary skill in the art. In some embodiments, the executable control software can be stored on a transitory or non-transitory computer readable medium, including, but not limited to, local computer memory, RAM, optical storage media, magnetic storage media, flash memory, and the like, and some or all of the control circuitry, the programmable processors, and the control software can execute and control at least some of the methods described above.

Although a few embodiments have been described in detail above, other modifications are possible. For example, the logic flows described above do not require the particular order described or sequential order to achieve desirable results. Other steps may be provided, steps may be eliminated from the described flows, and other components may be added to or removed from the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A method comprising:
   storing a plurality of video data streams of a monitored region in a data repository;
   storing respective asynchronous streams of metadata of each of the plurality of video data streams in the data repository;
   identifying a first physical object present in the monitored region and depicted in at least one of the plurality of video data streams;
   using the respective asynchronous streams of metadata of each of the plurality of video data streams to identify correlations or interactions between the first physical object and a plurality of other physical objects over time, the plurality of other physical objects being present in the monitored region and depicted in at least some of the plurality of video streams; and
   replicating a story of the first physical object using the correlations or interactions between the first physical object and the plurality of other physical objects over time.

2. The method of claim 1 wherein the first physical object includes a person or a structure in the monitored region.

3. The method of claim 1 further comprising using the respective asynchronous streams of metadata of each of the plurality of video data streams to classify, detect, identify, locate, or track the first physical object or to identify a relationship between the first physical object and the plurality of other physical objects.

4. The method of claim 1 further comprising refining the respective asynchronous streams of metadata of each of the plurality of video data streams stored in the data repository based on the correlations or the interactions between the first physical object and the plurality of other physical objects identified over time.

5. The method of claim 1 wherein replicating the story of the first physical object includes generating an incident management report on top of the respective asynchronous streams of metadata of each of the plurality of video data streams, and wherein the incident management report summarizes the correlations or the interactions between the first physical object and the plurality of other physical objects over time.

6. The method of claim 1 wherein replicating the story of the first physical object includes generating a storyboard on top of the respective asynchronous streams of metadata of each of the plurality of video data streams, and wherein the storyboard summarizes the correlations of the interactions between the first physical object and the plurality of other physical objects over time.

7. The method of claim 6 wherein the storyboard orders the plurality of video data streams to present an intelligent view of the story of the first physical object irrespective of an order of the plurality of video data streams in the data repository.

8. The method of claim 6 further comprising streaming the respective asynchronous streams of metadata of each of the plurality of video data streams to a user interface device displaying the storyboard.

9. A method comprising:
storing a plurality of video data streams of a monitored region in a data repository;
storing respective metadata of each of the plurality of video data streams in the data repository;
a classification module asynchronously analyzing the plurality of video data streams and the respective metadata of each of the plurality of video data streams to classify physical objects present in the monitored region and depicted in at least some of the plurality of video data streams;
an interaction module asynchronously analyzing the plurality of video data streams and the respective metadata of each of the plurality of video data streams to classify interactions of the physical objects;
a relationship builder asynchronously analyzing the plurality of video data streams and the respective metadata of each of the plurality of video data streams to build relationships of the physical objects; and
based on the physical objects as classified, the interactions of the physical objects, and the relationships of the physical objects, presenting a story of at least one of the physical objects, at least one of the interactions of the at least one of the physical objects, or at least one of the relationships of the at least one of the physical objects.

10. The method of claim 9 further comprising:
based on the physical objects as classified, the interactions of the physical objects, and the relationships of the physical objects, identifying the at least one of the physical objects, the at least one of the interactions of the at least one of the physical objects, the at least one of the relationships of the at least one of the physical objects, or an event sequence of the at least one of the physical objects as suspicious; and
presenting the story of the at least one of the physical objects, the at least one of the interactions of the at least one of the physical objects, the at least one of the relationships of the at least one of the physical objects, or the event sequence of the at least one of the physical objects identified as suspicious.

11. The method of claim 9 wherein the physical objects include a person or a structure in the monitored region.

12. The method of claim 9 further comprising refining the respective metadata of each of the plurality of video data streams stored in the data repository based on the physical objects as classified, the interactions of the physical objects, and the relationships of the physical objects identified over time.

13. The method of claim 9 wherein presenting the story of the at least one of the physical objects, the at least one of the interactions of the at least one of the physical objects, or the at least one of the relationships of the at least one of the physical objects includes generating an incident management report on top of the respective metadata of each of the plurality of video data streams, and wherein the incident management report summarizes the at least one of the physical objects as classified, the at least one of the interactions of the at least one of the physical objects, and or the at least one of the relationships of the at least one of the physical objects.

14. The method of claim 9 wherein presenting the story of the at least one of the physical objects, the at least one of the interactions of the at least one of the physical objects, or the at least one of the relationships of the at least one of the physical objects includes generating a storyboard on top of the respective metadata of each of the plurality of video data streams, and wherein the storyboard summarizes the at least one of the physical objects as classified, the at least one of the interactions of the at least one of the physical objects, and the at least one of the relationships of the at least one of the physical objects.

15. The method of claim 14 wherein the storyboard orders the plurality of video data streams to present an intelligent view of the story of the at least one of the physical objects, the at least one of the interactions of the at least one of the physical objects, or the at least one of the relationships of the at least one of the physical objects irrespective of an order of the plurality of video data streams in the data repository.

16. The method of claim 14 further comprising streaming the respective metadata of each of the plurality of video data streams to a user interface device displaying the storyboard.

17. A method comprising:
storing a plurality of video data streams of a monitored region in a data repository;
storing respective metadata of each of the plurality of video data streams in the data repository;
a classification module asynchronously analyzing the respective metadata of each of the plurality of video data streams to classify physical objects present in the monitored region and depicted in at least some of the plurality of video data streams;
an interaction module asynchronously analyzing the respective metadata of each of the plurality of video data streams to classify interactions of the physical objects;
a relationship builder asynchronously analyzing the respective metadata of each of the plurality of video data streams to build relationships of the physical objects; and
based on the physical objects as classified, the interactions of the physical objects, and the relationships of the physical objects, presenting a story of at least one of the physical objects, at least one of the interactions of the at least one of the physical objects, or at least one of the relationships of the at least one of the physical objects.

18. The method of claim 17 further comprising refining the respective metadata of each of the plurality of video data streams stored in the data repository based on the physical objects as classified, the interactions of the physical objects, and the relationships of the physical objects identified over time.

19. The method of claim 17 wherein presenting the story of the at least one of the physical objects, the at least one of the interactions of the at least one of the physical objects, or the at least one of the relationships of the at least one of the physical objects includes generating an incident management report on top of the respective metadata of each of the plurality of video data streams, and wherein the incident management report summarizes the at least one of the physical objects as classified, the at least one of the interactions of the at least one of the physical objects, and the at least one of the relationships of the at least one of the physical objects.

20. The method of claim 17 wherein presenting the story of the at least one of the physical objects, the at least one of the interactions of the at least one of the physical objects, or the at least one of the relationships of the at least one of the physical objects includes generating a storyboard on top of the respective metadata of each of the plurality of video data streams, and wherein the storyboard summarizes the at least one of the physical objects as classified, the at least one of the interactions of the at least one of the physical objects, and the at least one of the relationships of the at least one of the physical objects.

* * * * *